(12) United States Patent
Chalin

(10) Patent No.: US 6,508,393 B2
(45) Date of Patent: Jan. 21, 2003

(54) SUSPENSION SYSTEM INCLUDING ARM HAVING ZERO CLEARANCE AXLE CONNECTION

(75) Inventor: Thomas N. Chalin, Lucas, TX (US)

(73) Assignee: Watson & Chalin Manufacturing, Inc., McKinney, TX (US)

(*) Notice: Subject to any disclaimer, the term of this patent is extended or adjusted under 35 U.S.C. 154(b) by 0 days.

(21) Appl. No.: 09/814,535

(22) Filed: Mar. 22, 2001

(65) Prior Publication Data

US 2002/0134818 A1 Sep. 26, 2002

(51) Int. Cl.[7] .............................................. B21D 39/00
(52) U.S. Cl. ..................................... 228/136; 228/173.2
(58) Field of Search .............................. 228/136, 173.2; 280/124.128–124.132, 124.116, 124.11, 124.164

(56) References Cited

U.S. PATENT DOCUMENTS

| 1,200,305 A | 10/1916 | Brush |
| 1,899,347 A | 2/1933 | Mogford et al. |
| 3,801,086 A | 4/1974 | Raidel |
| 3,804,467 A | 4/1974 | Austermaun |
| 3,905,086 A | * 9/1975 | Tetlak ..................... 228/173.1 |
| RE30,308 E | 6/1980 | Masser |
| 4,361,360 A | 11/1982 | Kuether |
| 4,427,213 A | 1/1984 | Raidel, Jr. |
| 4,486,029 A | 12/1984 | Raidel |
| 4,566,719 A | 1/1986 | VanDenberg |
| 4,615,539 A | 10/1986 | Pierce |
| 4,718,692 A | 1/1988 | Raidel |
| 4,722,549 A | 2/1988 | Raidel |
| 4,763,953 A | 8/1988 | Chalin |
| 4,770,430 A | 9/1988 | Lange |
| 4,881,747 A | 11/1989 | Raidel |
| 4,902,035 A | 2/1990 | Raidel |
| 5,002,305 A | 3/1991 | Raidel |
| 5,015,004 A | 5/1991 | Mitchell |
| 5,018,756 A | 5/1991 | Mitchell |
| 5,037,126 A | 8/1991 | Gottschalk et al. |
| 5,269,593 A | 12/1993 | Wasson |
| 5,366,237 A | 11/1994 | Dilling et al. |
| 5,375,871 A | 12/1994 | Mitchell et al. |
| 5,476,251 A | * 12/1995 | Moses et al. ................ 180/905 |
| 5,634,655 A | 6/1997 | Chalin |
| 5,683,098 A | 11/1997 | VanDenberg |
| 5,720,491 A | * 2/1998 | Harper ........................ 280/276 |
| 5,810,377 A | 9/1998 | Keeler et al. |
| 5,868,418 A | 2/1999 | VauDenberg |
| 6,039,336 A | 3/2000 | Frey |
| 6,209,895 B1 | * 4/2001 | Mueller et al. ........ 280/124.116 |
| 6,241,266 B1 | * 6/2001 | Smith et al. ........... 280/124.116 |

* cited by examiner

Primary Examiner—Tom Dunn
Assistant Examiner—Jonathan Johnson
(74) Attorney, Agent, or Firm—Konneker & Smith, P.C.

(57) ABSTRACT

A suspension system is provided which includes an arm having a zero clearance axle connection. In a described embodiment, a method is provided for manufacturing the suspension system, which method includes the steps of welding an axle connector to an axle, without first pressing the axle connector onto an end of the axle, and without using a clamp to hold the axle connector in contact with the axle, and welding the axle connector to a pivot arm.

15 Claims, 2 Drawing Sheets

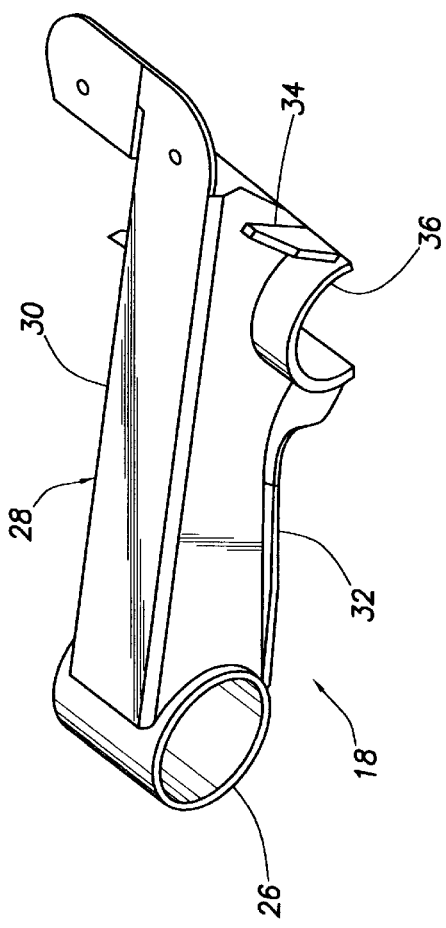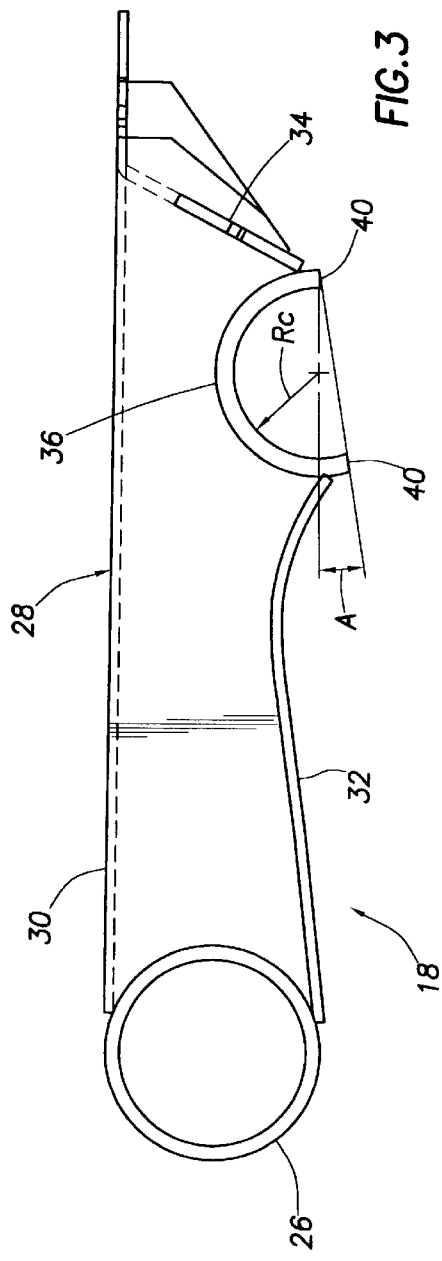

SUSPENSION SYSTEM INCLUDING ARM HAVING ZERO CLEARANCE AXLE CONNECTION

BACKGROUND

The present invention relates generally to vehicle suspension systems and, in an embodiment described herein, more particularly provides a suspension system including an arm having a zero clearance axle connection.

Many systems and methods have been devised in the past for making an axle attachment in a vehicle suspension system. However, the ongoing efforts to reduce suspension system weight, reduce manufacturing costs, reduce manufacturing inventory and increase manufacturing speed have highlighted the shortcomings of these past suspension systems.

In one past suspension system, an axle connector is made up of multiple pieces. The multiple pieces are then assembled and clamped to an axle using a separate clamp. The multiple pieces are then welded to the axle.

Note that, in this suspension system, the multiple axle connector pieces must be inventoried, the multiple pieces must be assembled and a clamp must be used to clamp the axle connector to the axle. These extra steps, inventory and manufacturing equipment could be eliminated, thereby reducing manufacturing costs and time.

In another past suspension system, and axle connector is pressed onto an end of an axle. A special press must be used in the manufacturing process in order to accommodate the length of the axle. Furthermore, the axle connector and the axle must be machined to close tolerances, so that a precise interference fit is achieved between the parts.

Note that, in this suspension system, special manufacturing equipment must be used, and increased costs and time are associated with the close tolerance machining required on the axle and axle connector. This special equipment and increased cost and time could be eliminated, thereby increasing manufacturing economy and speed.

SUMMARY

In carrying out the principles of the present invention, in accordance with an embodiment thereof, a suspension system is provided which has a reduced number of steps in its manufacture, has a reduced weight, has improved ease of manufacture, and which provides increased strength in an axle to pivot arm connection.

In one aspect of the invention, a method of manufacturing a vehicle suspension system is provided. The method includes the steps of welding an axle connector to an axle, without first pressing the axle connector onto an end of the axle, and without using a clamp to hold the axle connector in contact with the axle, and welding the axle connector to a pivot arm.

In another aspect of the invention, another method of manufacturing a vehicle suspension system is provided. In the method, an axle connector is connected to an axle by elastically deforming the axle connector. The axle connector extends less than completely about the axle when the axle connector is attached to the axle.

The above methods provide many benefits, such as, no clearance existing between the axle connector and the axle, no need for clamps to hold the axle connector in contact with the axle, and no need to press the axle connector over an end of the axle.

These and other features, advantages, benefits and objects of the present invention will become apparent to one of ordinary skill in the art upon careful consideration of the detailed description of a representative embodiment of the invention hereinbelow and the accompanying drawings.

BRIEF DESCRIPTION OF THE DRAWINGS

FIG. 2 is a perspective view of a pivot arm assembly of the suspension system of FIG. 1; and FIG. 3 is a side elevational view of the pivot arm assembly.

DETAILED DESCRIPTION

Figure 1:
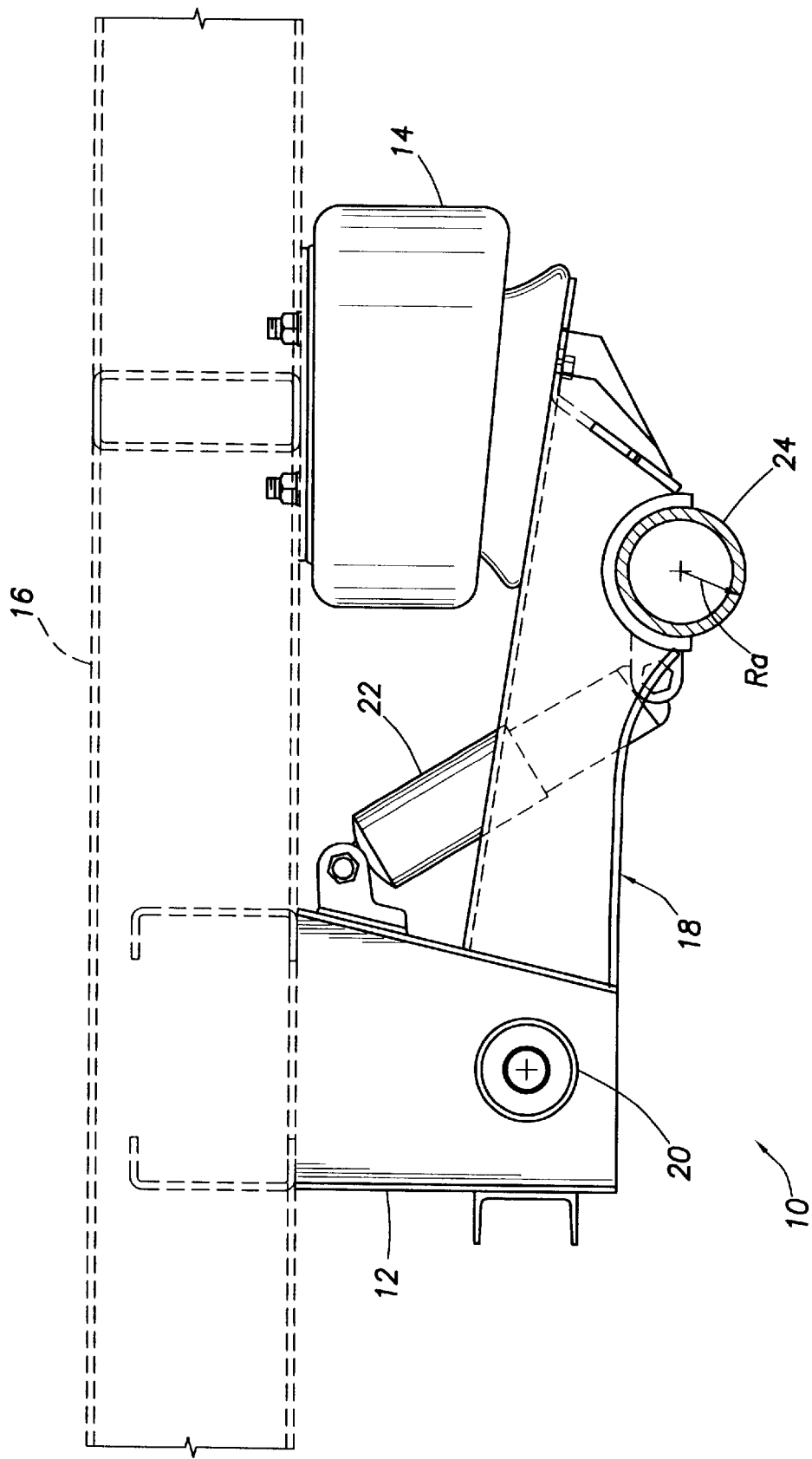
FIG. 1 is a side elevational view of a suspension system embodying principles of the present invention.

Representatively illustrated in FIG. 1 is a vehicle suspension system which embodies principles of the present invention. In the following description of the suspension system 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

Various typical components of the suspension system 10 have not been illustrated in FIG. 1. For example, wheels, tires, brake components, etc. have been eliminated from the view shown in FIG. 1, for increased clarity of description and illustration.

The suspension system 10 includes a hanger bracket 12 and an air spring 14 for supporting a vehicle frame 16 above the suspension system 10. A pivot arm assembly 18 is pivotably attached to the hanger 12 by means of a bushing 20. A shock absorber 22 dampens movements of the pivot arm assembly 18.

The pivot arm assembly 18 is attached at its rearward end to an axle 24. The axle 24 extends laterally with respect to the frame 16. In typical fashion, a set of the hanger 12, air spring 14, pivot arm assembly 18 and shock absorber 22 are positioned at each opposite end of the axle 24. Note that, although the axle 24 is depicted in FIG. 1 as being tubular and having a cylindrical cross-section, any axle configuration may be used, without departing from the principles of the present invention.

Referring additionally now to FIG. 2, a perspective view of the pivot arm assembly 18 is representatively illustrated. In this view it may be clearly seen that the pivot arm assembly 18 is made up of a bushing tube 26, a pivot arm 28, a rear support plate 34 and an axle connector member 36. The pivot arm 28 includes an upper folded-over portion 30 forming a top and sides of the pivot arm, and a lower portion 32 connecting the sides of the pivot arm. The rear support plate 34 closes off the rear of the pivot arm 28 and provides additional support for attachment of the air spring 14.

The axle connector 36 is uniquely configured and is an important aspect of a method of manufacturing the suspension system 10. As may be better viewed in FIG. 3, which shows an enlarged side view of the pivot arm assembly 18, the axle connector 36 is configured so that it extends more than halfway about the axle 24, without completely encircling the axle. As representatively depicted in FIG. 3, one end of the axle connector 36 extends an angular distance A below horizontal, with respect to the other end of the axle connector. Preferably, the angle A is about 9°, but other angles maybe used in keeping with the principles of the invention.

In the method of manufacturing the suspension system 10, the axle connector 36 is attached to the axle 24 by elastically deforming the axle connector, so that it fits over the outer diameter of the axle. The axle connector 36 then springs back and grips onto the outer diameter of the axle. Thus, when the axle connector 36 is formed, it has an inner radius Rc which is less than an outer radius Ra of the axle 24. The axle connector 36 is elastically spread, so that its ends 40 fit over the outer diameter of the axle 24 (which also causes its radius Rc to become greater than the axle radius Ra), and then the axle connector is allowed to spring back onto the outer diameter of the axle.

This method of attaching the axle connector 36 to the axle 24 provides many benefits. For example, no separate clamps are required to hold the axle connector 36 in contact with the axle 24 while the axle connector is welded to the axle. No special press is required to accommodate the length of the axle 24, since the axle connector 36 is not pressed over an end of the axle. No close tolerance machining is needed for the axle connector 36 radius Rc or the axle 24 radius Ra, since the elastic grip of the axle connector onto the axle will compensate for a relatively wide range of the radii Rc and Ra. There exists no clearance between the axle connector 36 and the axle 24 at the time the axle connector is welded to the axle, thereby reducing the possibility of stress risers and increasing the strength of the weld. The axle connector 36 is a single member, thereby reducing the number of components which must be inventoried and assembled. The attachment of the axle connector 36 to the axle 24 is a straightforward and quick operation, thereby reducing manufacturing time. Prior to welding, the axle connector 36 may be relatively easily repositioned on the axle 24 for alignment purposes, etc. The axle connector 36 does not extend completely about the axle 24, thereby permitting it to be attached to the axle from a lateral direction, rather than from an end of the axle, although it could be installed over an end of the axle in keeping with the principles of the invention.

After the axle connector 36 is attached to the axle 24, it may be welded to the axle, and then the axle connector may be welded to the remainder of the pivot arm assembly 18. Alternatively, the axle connector 36 may be welded to the pivot arm assembly 18 prior to being welded to the axle 24. Of course, if appropriately configured, the axle connector 36 could also be welded to the pivot arm assembly 18 prior to being attached to the axle 24.

As representatively illustrated herein, the axle connector 36 extends greater than 180° about the cylindrical outer diameter of the axle 24. However, it will be readily appreciated that, if the axle 24 has another shape, such as rectangular, etc., then the axle connector 36 may also be differently shaped so that it extends greater than halfway about the axle.

Note that the axle connector 36 has been described herein as being used to connect a pivot arm 28 to an axle 24, but other uses may be made of the principles of the present invention. For example, a similar axle connector could be used to attach other components, such as air springs, shocks, spring beams, etc., to an axle.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A method of manufacturing a vehicle suspension system, the method comprising the steps of:

welding an axle connector to an axle, without first pressing the axle connector onto the axle from an end of the axle, and without using a clamp to hold the axle connector in contact with the axle; and welding the axle connector to a pivot arm.

2. The method according to claim 1, wherein in the step of welding the axle connector to the axle, the axle connector is held in contact with the axle by elastically deforming the axle connector.

3. The method according to claim 2, wherein the elastically deforming step further comprises enlarging an inner dimension of the axle connector, so that the axle connector inner dimension is larger than an outer dimension of the axle at a location in which the axle connector is held in contact with the axle during the step of welding the axle connector to the axle.

4. The method according to claim 1, wherein in the step of welding the axle connector to the axle, no clearance exists between the axle connector and the axle.

5. The method according to claim 1, wherein in the step of welding the axle connector to the axle, the axle connector is a single structure which extends greater than halfway about the axle.

6. The method according to claim 1, wherein in the step of welding the axle connector to the axle, the axle has a cylindrical outer surface, the axle connector is a single structure, and the axle connector extends greater than 180° about the axle outer surface.

7. The method according to claim 1, wherein the step of welding the axle connector to the pivot arm is performed after the step of welding the axle connector to the axle.

8. A method of manufacturing a vehicle suspension system, the method comprising the step of:

attaching an axle connector to an axle by elastically deforming the axle connector, the axle connector extending less than completely about the axle when the axle connector is attached to the axle.

9. The method according to claim 8, further comprising the steps of wiling the axle connector to the axle, and welding the axle connector to a pivot arm.

10. The method according to claim 9, wherein the axle connector is welded to the axle prior to the step of welding the axle connector to the pivot arm.

11. The method according to claim 8, wherein in the attaching step, the axle connector extends greater than halfway about the axle.

12. The method according to claim 8, wherein in the attaching step, the axle has a cylindrical outer surface, and the axle connector extends greater than 180° about the axle outer surface.

13. The method according to claim 8, wherein in the attaching step, no separate clamp is used to hold the axle connector in contact with the axle.

14. The method according to claim 8, wherein the attaching step is performed without pressing the axle connector axially onto an end of the axle.

15. The method according to claim 8, wherein in the attaching step, no clearance exists between the axle connector and the axle when the axle connector is attached to the axle.

* * * * *

(12) INTER PARTES REEXAMINATION CERTIFICATE (0041st)

United States Patent
Chalin

(10) Number: US 6,508,393 C1
(45) Certificate Issued: Nov. 25, 2008

(54) SUSPENSION SYSTEM INCLUDING ARM HAVING ZERO CLEARANCE AXLE CONNECTION

(75) Inventor: Thomas N. Chalin, Lucas, TX (US)

(73) Assignee: Watson & Chalin Manufacturing, Inc., McKinney, TX (US)

Reexamination Request:
No. 95/000,030, Dec. 3, 2003

Reexamination Certificate for:
Patent No.: 6,508,393
Issued: Jan. 21, 2003
Appl. No.: 09/814,535
Filed: Mar. 22, 2001

(51) Int. Cl.
*B60G 7/00* (2006.01)
*B60G 11/27* (2006.01)
*B60G 11/26* (2006.01)
*B60G 9/00* (2006.01)

(52) U.S. Cl. .................................. 228/136; 228/173.2
(58) Field of Classification Search ............... None
See application file for complete search history.

(56) References Cited

U.S. PATENT DOCUMENTS 5,375,871 A * 12/1994 Mitchell et al. ....... 280/124.116
6,039,336 A * 3/2000 Frey .................... 280/124.128
6,241,266 B1 * 6/2001 Smith et al. ........... 280/124.116
6,508,393 B2 * 1/2003 Chalin ...................... 228/136
6,508,482 B2 * 1/2003 Pierce et al. .......... 280/124.116
2001/0020775 A1 * 9/2001 Pierce et al. .......... 280/124.128

FOREIGN PATENT DOCUMENTS

WO   WO 00/01548   *   1/2000

OTHER PUBLICATIONS

"Hendrickson and Daimler–Benz Reduce Weight of Discos Axle," Trailer/Body Builders article, Feb. 1999, pp. 60–61.
Daimler–Benz and Hendrickson, "Introducing HDB—Revolution and Reliability with Disc Braked Modules," Discos Systems Solutions, Special Edition for IAA Commercial Vehicles '98, Hall 13, Stand A52, p. 3.

* cited by examiner

*Primary Examiner*—Krisanne Jastrzab

(57) ABSTRACT

A suspension system is provided which includes an arm having a zero clearance axle connection. In a described embodiment, a method is provided for manufacturing the suspension system, which method includes the steps of welding an axle connector to an axle, without first pressing the axle connector onto an end of the axle, and without using a clamp to hold the axle connector in contact with the axle, and welding the axle connector to a pivot arm.

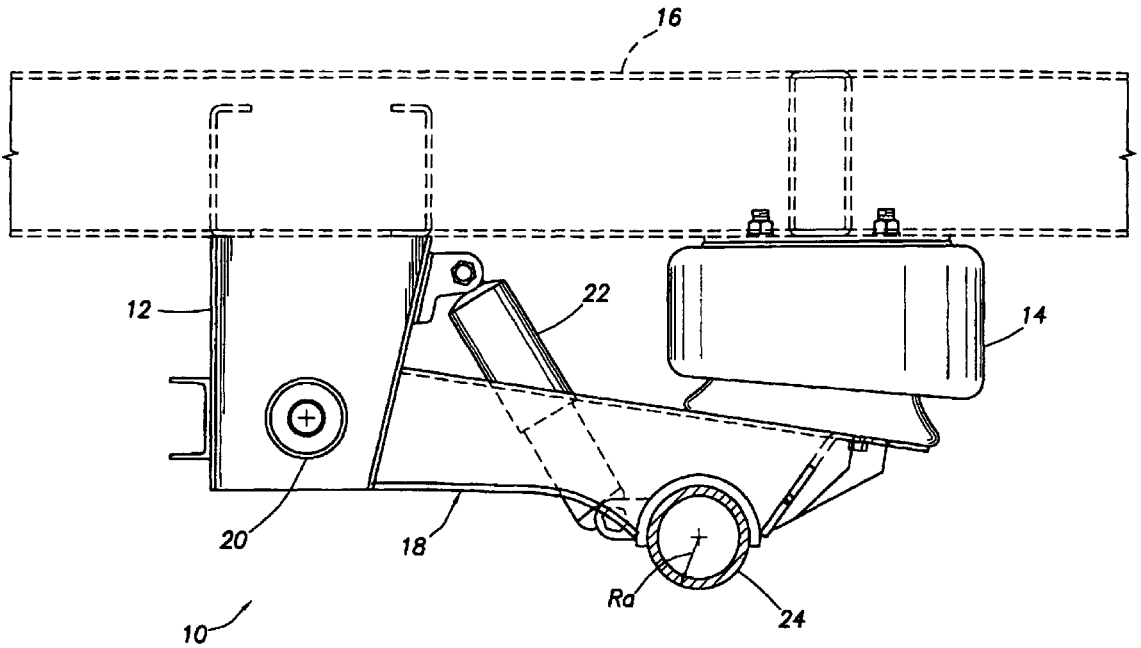

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–15 are cancelled.

[1. A method of manufacturing a vehicle suspension system, the method comprising the steps of:

welding an axle connector to an axle, without first pressing the axle connector onto the axle from an end of the axle, and without using a clamp to hold the axle connector in contact with the axle; and welding the axle connector to a pivot arm.]

\* \* \* \* \*